United States Patent [19]
Rune et al.

[11] Patent Number: 5,316,733
[45] Date of Patent: May 31, 1994

[54] CLEAN BOX WITH SLIDING ARMS

[75] Inventors: Gordon H. Rune, Mundelein; Bruce A. Wojtysiak, Grandwood Park, both of Ill.

[73] Assignee: Piper Plastics, Inc., Libertyville, Ill.

[21] Appl. No.: 868,992

[22] Filed: Apr. 15, 1992

[51] Int. Cl.$^5$ .............................................. B01L 7/00
[52] U.S. Cl. ........................................ 422/104; 312/1; 435/809; 600/21; 600/22
[58] Field of Search ............. 422/104; 435/809; 119/35, 37, 15, 158; 600/21, 22; 312/1; 128/202.12; D24/163

[56] References Cited

U.S. PATENT DOCUMENTS

| | | | |
|---|---|---|---|
| 1,642,577 | 9/1927 | Carson | 312/1 |
| 2,600,240 | 6/1952 | Grieb | 312/1 |
| 3,084,684 | 4/1963 | Saunders | D24/163 |
| 3,498,687 | 3/1970 | Diccianni | 312/1 |
| 4,111,753 | 9/1978 | Folsom et al. | 312/1 |
| 4,773,392 | 9/1988 | Koch | 600/32 |
| 4,876,773 | 10/1989 | Wade | 600/21 |
| 4,920,768 | 5/1990 | Cares et al. | 312/1 |

Primary Examiner—Robert J. Warden
Assistant Examiner—Hien Tran
Attorney, Agent, or Firm—Eugene F. Friedman

[57] ABSTRACT

A clean box in which the rubber arms and hands may slide laterally relative to the remainder of the box. A first rigid plastic sheet has ovals passing through it. A second rigid plastic sheet, in front of the first, has circular openings on which the rubberized arm and hand gloves attach. The circular openings' diameter approximately equals the smaller dimension of the ovals on the first sheet of plastic. Resin strips provide an air seal along the upper and lower edges of the sliding first sheet of plastic. Wiper blades attached to the edges of the moving sheet complete the seal between the two sheets of plastic. A worker, with his hands and arms in the gloves and needing to reach a distant point in the clean box, may simply push against the edge of the openings for the gloves. The sheet of plastic will then move in the direction in which pushed. The clean box may have entirely rigid transparent sides to allow for a clear view. Angling the portion of the clean box above the arm openings provides a surface which will not likely reflect ambient light into the worker's eyes.

25 Claims, 4 Drawing Sheets

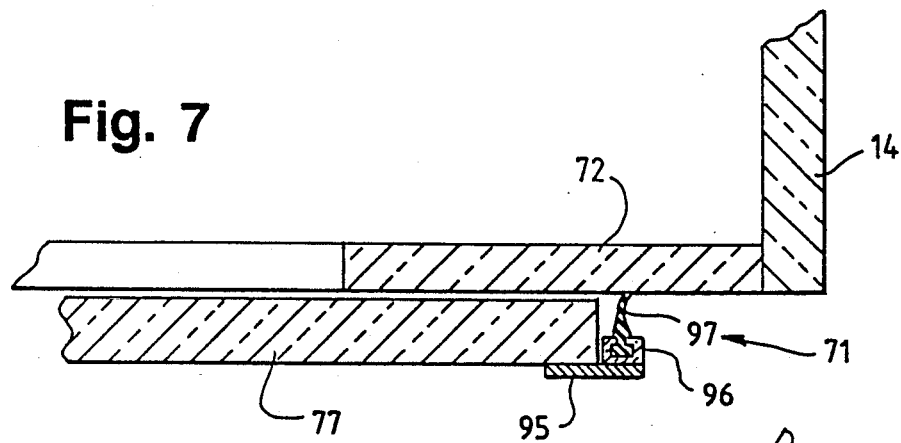
Fig. 7
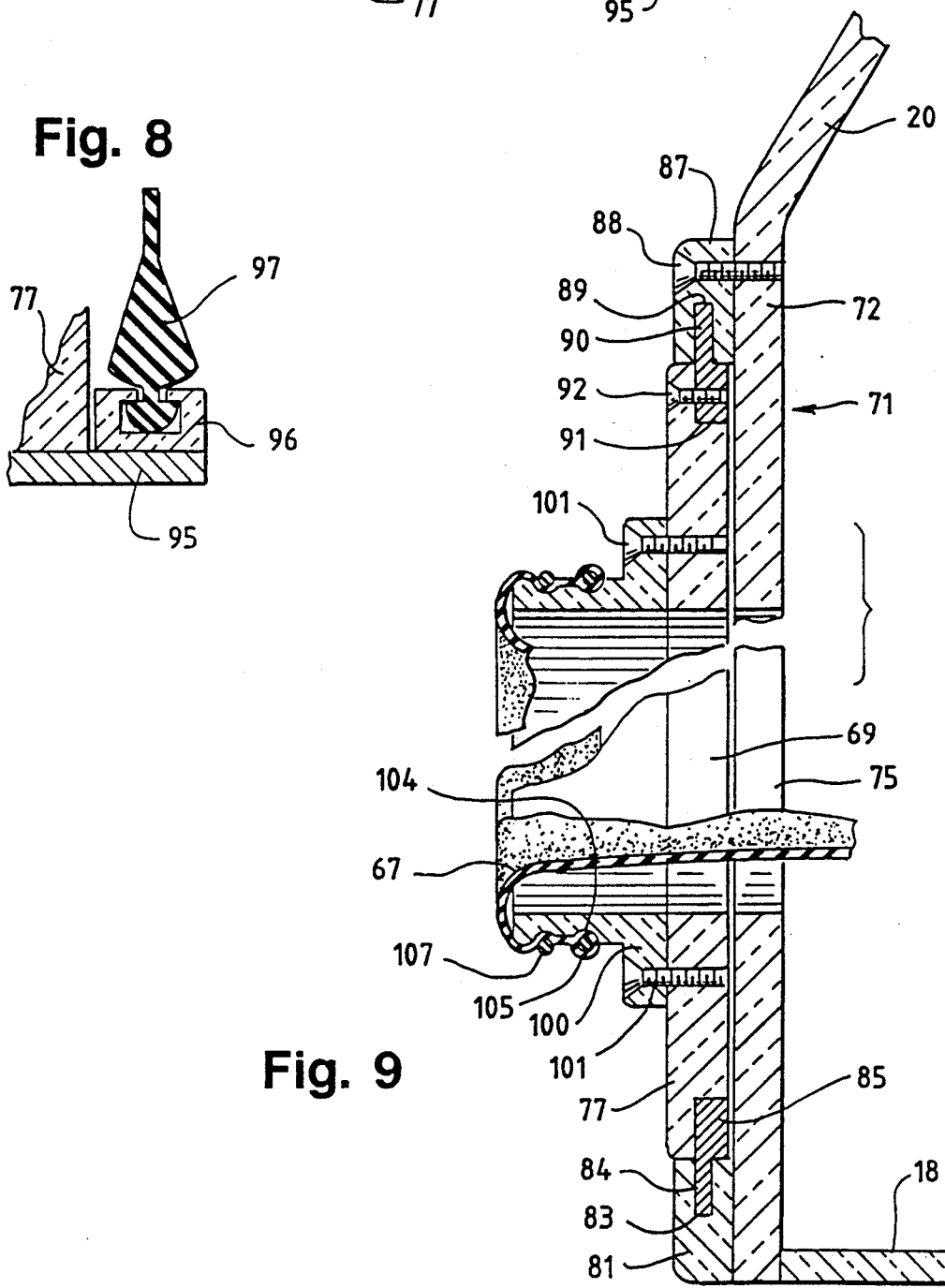
Fig. 8
Fig. 9

CLEAN BOX WITH SLIDING ARMS

BACKGROUND

Working on materials that must remain super clean, such as for example solid state electronics, requires an unquestionably pure atmosphere. Manufacturers of such components employ large clean rooms to assure the quality of their products. However, the entrance of a person into such clean rooms involves an extensive cleaning and dressing process that may consume at least 45 minutes before entering the room and another 45 minutes after departing the room. A clean box allows experimentation with materials on a much smaller scale and, at the same time, dispenses with the need for the extensive peripheral activity prior to entering and after departing the clean area.

Thus, clean boxes find a variety of uses including experimentation on materials and as incubators. In essence, the boxes provide a purified atmosphere and permit the entrance of a person's arms or other body parts in a fashion that allow him to work on items inside without introducing extraneous, contaminating matter. For example, the box may include rubberized, long gloves sealed to a side to prevent external air from entering the box. Yet, the operator, by placing his hands and arms in the gloves, can work upon material or even an infant lying inside the box. Yet, the gloves, formed of an air-impermeable material and having an air-tight seal to the remainder of the box, do not permit the passage of contaminants to the box's interior.

However, the boxes must have a sufficient size to hold the various components that might find use in an experiment or to contain an infant and the associated equipment and monitors. The problem then develops that a pair of rubberized gloves in a box of even minimally useful size cannot reach all areas on the box's interior. Thus, even though the box may contain important items, an operator's hands in the usual pair of gloves cannot reach all the components that he may desire. Further, the gloves display substantial stiffness to make sure that they do not allow for the penetration of outside, nonpurified air. This stiffness exacerbates this limited range of reach.

Manufacturers of clean boxes have attempted to ameliorate the problem of the operator lacking the ability to reach all areas on the interior in several fashions. Some boxes, for example, place three openings, each with a separate glove, along one side. The operator may select which adjoining two of the three openings to place his arms into. To reach an area that his initial selection would not permit, he simply removes his arms from the two openings, moves slightly to the side, inserts his hands through two gloves, including one not previously used, and achieves a reach over an area not previously accessible. While this increases the area of coverage inside a clean box, it still has undesirable drawbacks. Initially, the operator must take his hands off an item that he previously held. Furthermore, the presence of three, as opposed to two, rubberized gloves portends the greater likelihood of leaks developing with a concomitant introduction of unpurified air. Furthermore, the added equipment naturally increases the cost of the unit. And, the third glove may prove an encumbrance when not in use.

For relatively large clean boxes, one manufacture has used a rubberized, transparent, sheet of material that actually covers the upper portion of an operator's body. This allows him, from the waist up for examples, to actually enter the clean box from below and achieve some degree of movement. Again, however, this represents an extremely expensive manner in which to achieve accessibility over a greater area throughout the clean box. Furthermore, such a large sheet of material has an ever, greater likelihood of developing undesired leaks. Moreover, since the operator enters the upper-body sheet of material from the bottom, a large portion of the dry box's volume goes to accommodate the operator rather then the material contained inside. As a consequence, the search continues for a clean box having increased accessibility throughout its volume.

SUMMARY

Allowing substantially all of the rubberized arms themselves to move relative to the remainder of the clean box will achieve a greater accessibility to the box's contents. In general terms, a clean box includes a substantially airtight enclosure generally defining a volume of space. That volume should, usually, have a purified atmosphere. The enclosure also includes some form of manipulating device which has a composition of a web of flexible, substantially air-impermeable material. The manipulating device permits the handling by a body part in contact with that web of an object within the enclosure.

An improved clean box results where it also possesses a moving device coupled to the enclosure and the manipulating device. The moving device must permit the movement of substantially all the manipulating device relative to the remainder of the enclosure. To maintain the interior of the enclosure in a clean state, the improvement must also include a sealing device which couples to the moving device and the enclosure. The sealing device prevents the passage of a substantial amount of air between the manipulating device and the remainder of the enclosure as the manipulating device moves relative to the remainder of the enclosure.

Conveniently, the enclosure may have a space defined by substantially rigid sheets of transparent plastic. Arm openings permit the use of the rubberized gloves on one side of the enclosure. Gloves may attach to one sheet of plastic and pass through two circular openings through that sheet. This sheet may then move in a horizontal, linear fashion to permit the operator to reach the necessary areas within the box.

To make sure that the air inside remains clean, a second sheet of rigid plastic lies behind that to which the gloves attach. The second sheet remains stationary and has oval openings through it. The oval shape of these openings permit the movement of the rubberized arms from side to side as the operator reaches for different areas within the clean box. A seal around the moving section of plastic to which the arms attach prevents the passage of air between the two pieces of plastic having the various openings through them.

BRIEF DESCRIPTION OF THE DRAWINGS

FIG. 7 provides a cross-sectional view along the line 7—7 of the clean box of FIG. 1 showing the sliding seal between the two rigid panels that move horizontally relative to each other.

FIG. 8 gives an enlarged sectional view of the sealing wipe shown in FIG. 7.

FIG. 9 provides a cross-sectional view along the line 9—9 of the clean box of FIG. 1 showing in particular the attachment of the gloves to the sliding panel and the relationship of that panel to the stationary panel lying behind it.

DETAILED DESCRIPTION

Figure 1:
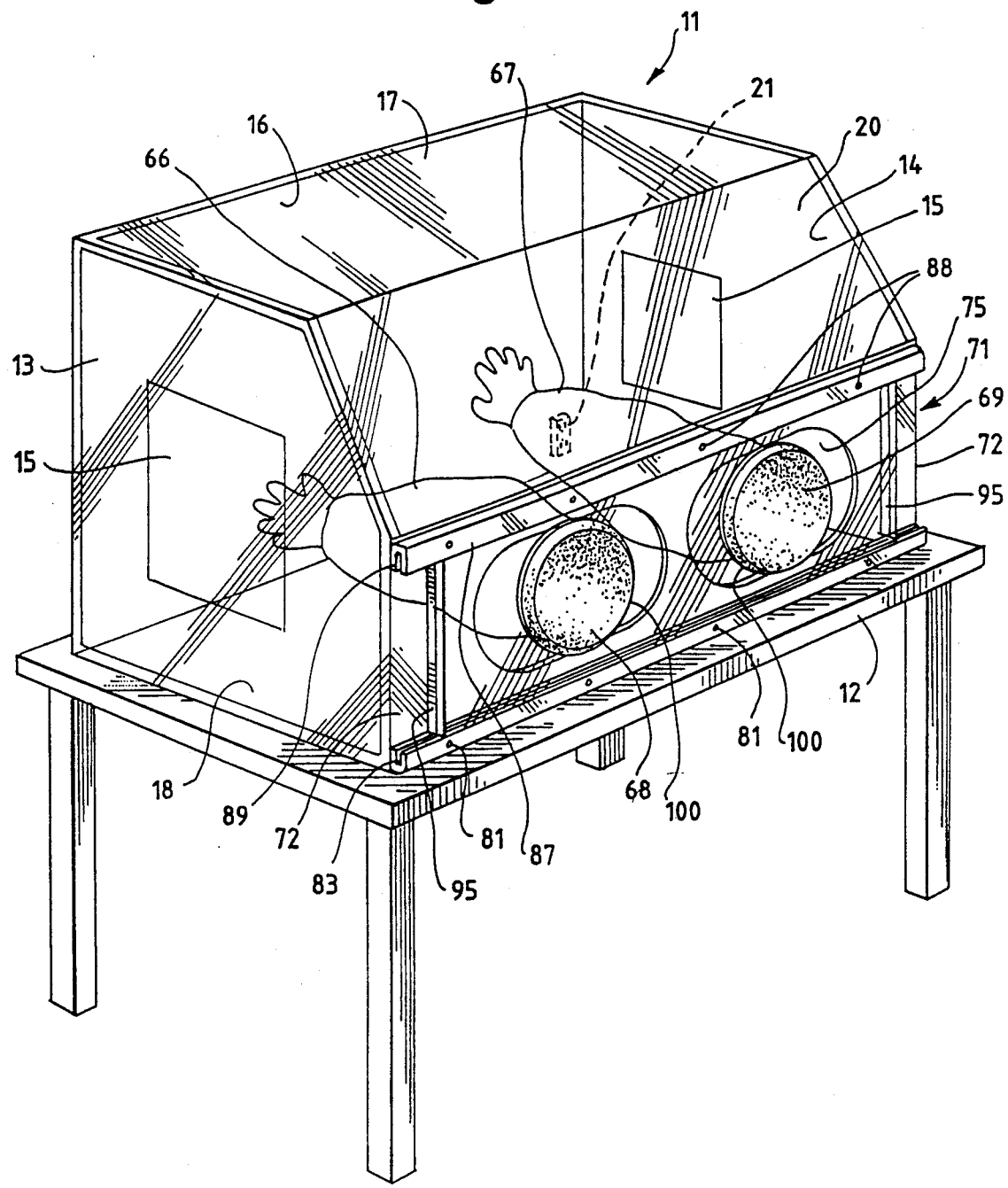
FIG. 1 is an isometric, diagrammatic view of a clean box in which the rubberized arms may slide from side to side.
Figure 3:
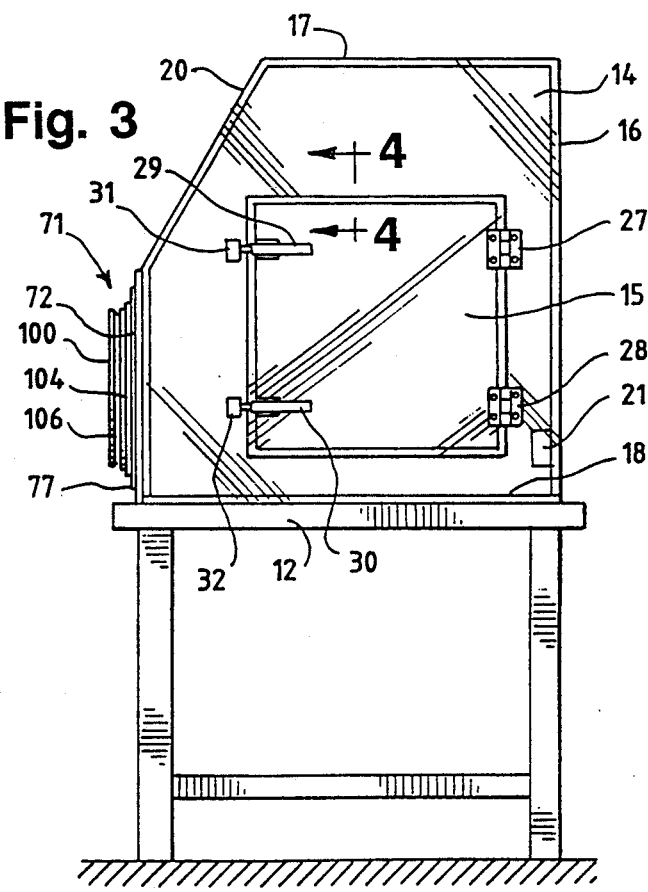
FIG. 3 provides a right side elevational view of the clean box of FIG. 1.

FIG. 1 shows a clean box generally at 11 sitting on the stand 12. The box 11 includes the transparent near side 13, the far side 14, the doors 15, the back 16, the top 17, and the bottom 18. As seen in FIGS. 1 and 3, the front of the box 11 has the upper section 20 which forms an angle of about 30 degrees relative to the vertical. This angle allows the operator to look through the transparent material of the section 20 without having the overhead lights reflect into his eyes. In general, an angle of about from 30 to 50 degrees suffices for this purpose.

The rigid nature of the material forming the clean box 11 allows for the attachment of the electrical 21 at a location removed from the floor or bottom 18 of the box 11. This lifts it out of the way of items on the bottom 18 and keeps it clear of liquids or powders that might spill there.

As seen in FIG. 3, the two hinges 27 and 28 attach the door 15 to the side 14. The latches 29 and 30 on the door 15 hook into the clasps 31 and 32 on the side 14 to ensure a tight closure. To prevent the passage of air around the door 15, the side 14 includes the attached bracket 35 which in turn supports the rubber O-ring 36. When the door 15 closes, it pushes against the O-ring 36 to provide an airtight seal.

All of the sections of material forming the box 11 have a composition of a clear, plastic material such as the S. F. acrylic sheet manufactured by Cyro Industries of Woodcliff Lake, N.J. The transparent nature of this material permits the operator an easy view into the interior of the box 11 while he works.

Figure 5:
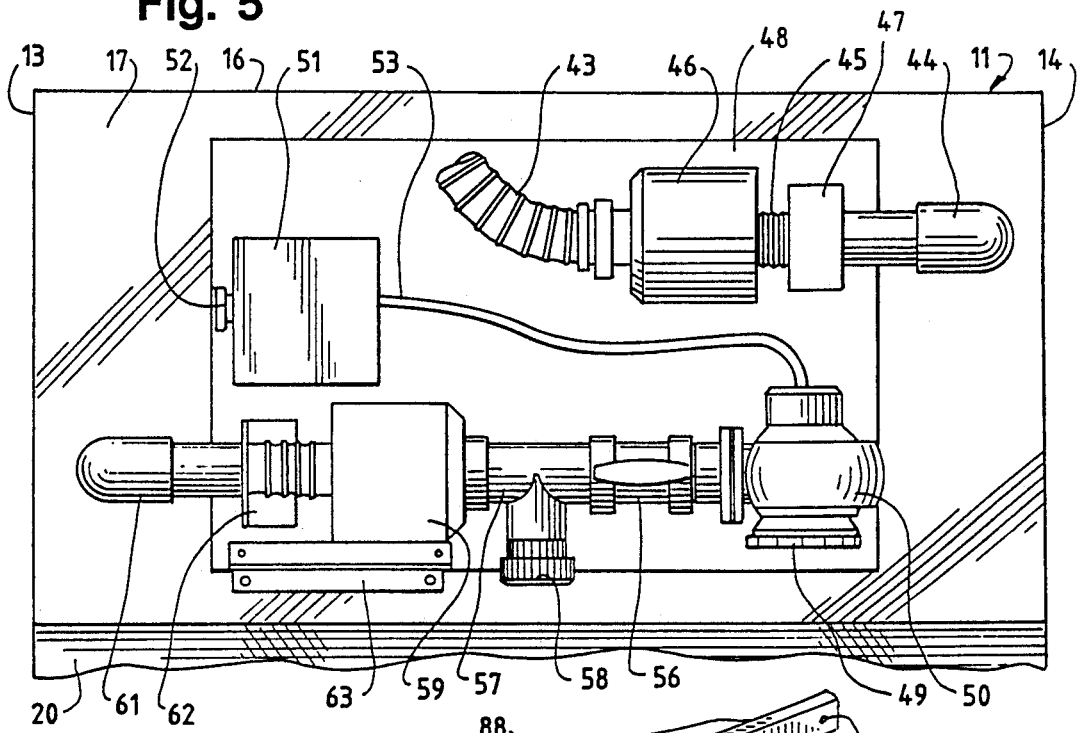
FIG. 5 gives a diagrammatic top plan view of a clean box showing, in particular, the various components for providing air to its interior.

FIG. 5 shows an arrangement of components for supplying clear air of the appropriate pressure to the interior of the chamber 11. To begin with, the exhaust hose 43 may connect to, for example, a negative pressure manifold in a laboratory. This would provide for a negative pressure within the chamber 11 unless other components overcome the negative exhaust to provide a positive pressure. Alternately, venting the exhaust into the general environment would allow the control of the pressure within the chamber by other components which could then provide a positive or negative pressure. In any event, the exhaust passing through the hose 43 travels from the chamber 11 through the elbow 44 and then the coupling 45, to the HEPA (High Efficiency Particulate Air) filter 46 which removes any contaminants that might have become entrained inside the chamber 11. The bracket 47 secures the various components to the mounting board 48.

Air entering the chamber 11 first passes through the prefilter 49 and then into the blower 50. The variable transformer 51 provides power along the lead 53 to the blower 50. Turning the rheostat 52 changes the current to, and thus the speed of, the blower 50 and accordingly the pressure that it provides to the interior of the chamber 11. The air from the blower 50 then passes through the ball valve 56 which provides a fine adjustment on the amount of air pressure passing from the blower 50 to the chamber 11. The air then passes through the tee 57 which has the cap 58 and then into the HEPA filter 59 which keeps contaminants out of the interior of the chamber 11. The flexible connection 60 then provides the air to the elbow 61 which introduces it into the interior of the chamber 11. Again, the bracket 62 helps hold the components onto the mounting board 48. The manometer 63 permits a determination of the pressure difference between the interior and exterior of the chamber 11.

As seen in FIG. 1, the hand-and-arm gloves 66 and 67 extend into the interior of the clean box 11 to allow an operator to handle items or a baby there. To do so, the operator extends his hands and arms through the openings 68 and 69 and into the gloves 66 and 67 respectively. The flexibility of the gloves 66 and 67 provide the operator with limited movement of his hands to carry out operations within the chamber 11.

Figure 2:
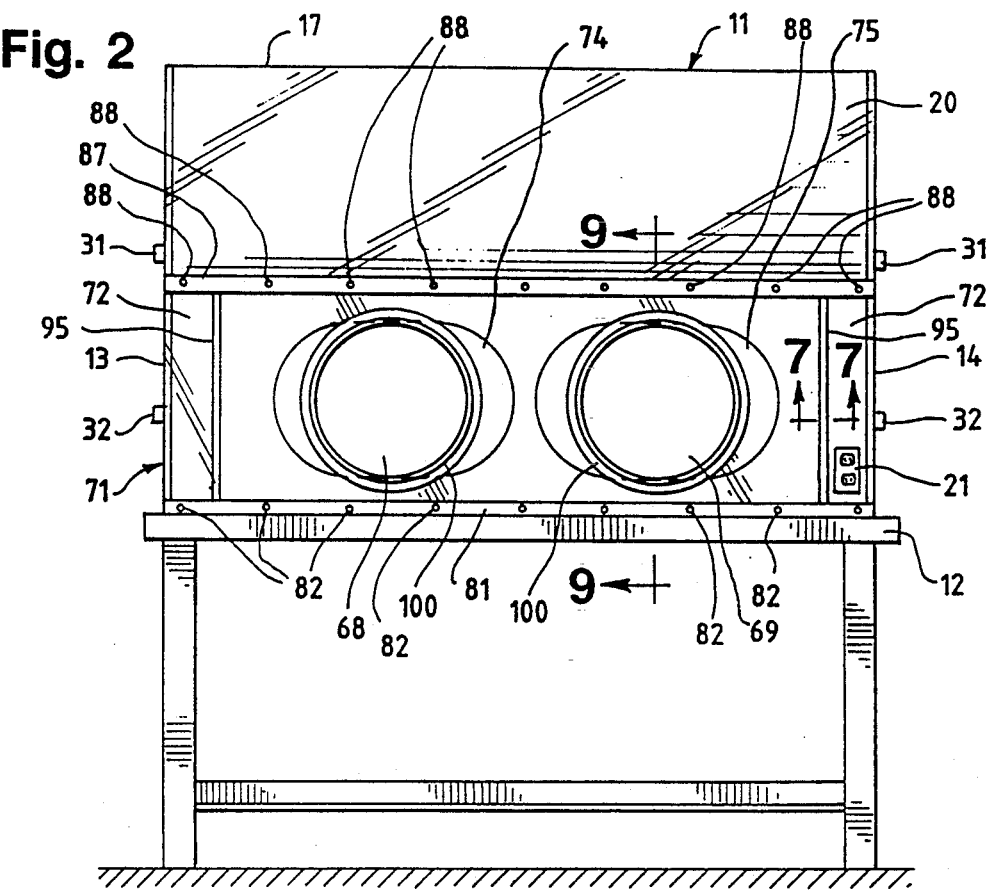
FIG. 2 gives a front, elevational view of the clean box of FIG. 1.
Figure 4:
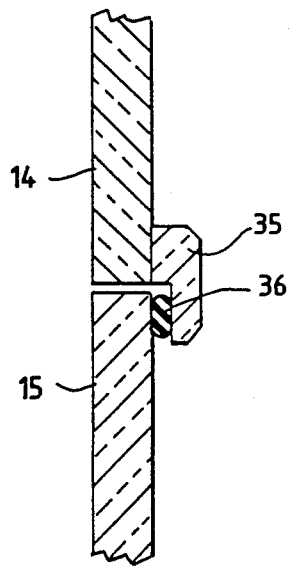
FIG. 4 provides a cross-sectional view along the line 4—4 of the portion of the clean box of FIG. 3 showing the seal between the door and the side of the clean box.
Figure 6:
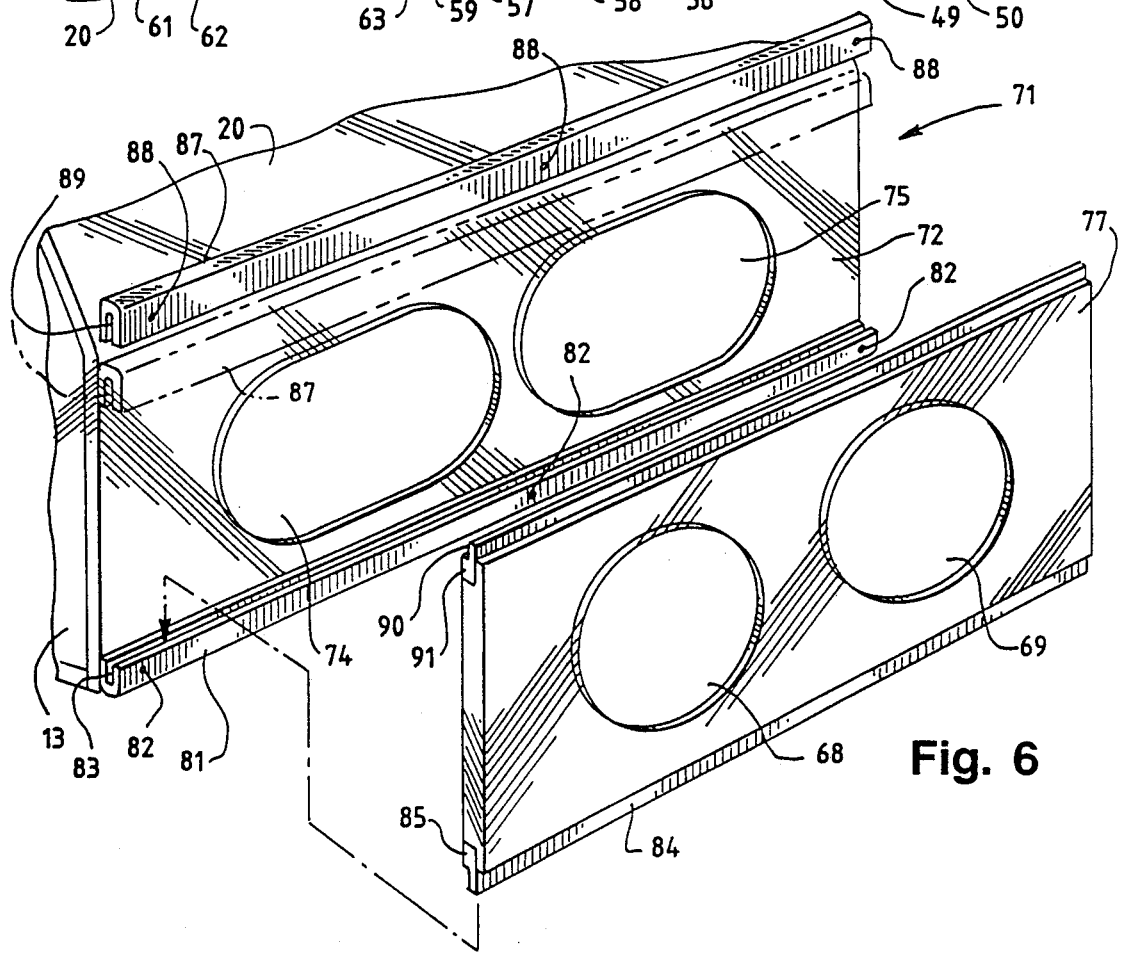
FIG. 6 provides an isometric, exploded, diagrammatic view of the front of the clean box of FIG. 1 showing, in particular, the two sheets that slide relative to each other to provide movement to the manipulating arms.

However, as seen in FIGS. 1 to 3 and more especially in FIGS. 6, 7, and 9, the lower front section indicated generally at 71 of the clean box 11 includes two rigid panels lying adjacent to each other. The rear section or panel 72 has a permanent attachment to the sloping upper section 20 and, in fact, may remain integral with it. It also permanently affixes to the floor 18 and to the sides 13 and 14 of the chamber 11. As seen most clearly in FIG. 6, the rear panel 72 has the oval openings 74 and 75 passing through it. The smaller dimension of these ovals 74 and 75 has a sufficient size to allow for the entrance of the gloves 68 and 69 seen in FIG. 1.

However, the gloves 68 and 69 do not attach to the rear panel 72; they simply pass through the oval openings 74 and 75. Again, in FIG. 6, the front panel 77 sits adjacent to and in front of the rear panel 72. It has the circular openings 68 and 69 to which the gloves 66 and 67 attach, as discussed below. As seen in FIGS. 6, 7, and 9, the front panel 77 sits immediately in front of the rear panel 72 and may slide along it. When an operator has his hands in the gloves 66 and 67 attached to the openings 68 and 69, he may move the front panel 77 to the left or right to achieve access to different parts of the interior of the clean box 11. As he does, the gloves may slide along in the oval openings 74 and 75. The greater lateral dimensions of the oval openings 74 and 75 permit the side-to-side, or horizontal, movement of the gloves 66 and 67 and thus the arms and hands of the operator. Thus, with a single pair of gloves, the operator, by sliding the panel 77 in either direction, may achieve access to substantially all of the interior of the clean box 11. He need not remove his hands from the gloves to accomplish this objective. The pressure of his arms against the sides of the openings 68 and 69 allows for the desired movement of the front panel 77 while he continues performing his work on the contents of the clean box 11.

Naturally, the entrance of unclean air between the rear panel 72 and the front panel 77 could bring contaminants into the interior of chamber 11. To prevent this, the panels must have a seal around their edges. To achieve this seal, the rear panel 72 has the lower strip 81 attached to it in an air-tight fashion by the screws 82. The groove 83 in the strip 81 faces upward to receive the tongue 84 on the lower strip 85 attached to the bottom edge of the front panel 77. The tongue 84 sitting in the groove 83 provides a substantially air-tight seal between the bottom edges of the rear panel 72 and the front panel 77. However, it still allows lateral motion between the two panels 72 and 77. Similarly, the upper strip 87 attaches to the rear panel 72 by the screws 88. Its depending groove 89 receives the upward directed tongue 90 of the strip 91 attached to the front panel 77 by the screws 92. Again, the tongue 90 in the groove 89 provides a basically air-tight seal along the top of the panels 72 and 77 while allowing lateral motion between them. The upper and lower plastic strips 81, 85, 87, and 91 may have a composition of an acetal resin such as Delrin150SA manufactured by the E. I. du Pont de Nemours & Co. of Wilmington, Del., or as Celcon sold by the Celoylese Corporation.

To provide a seal between the rear panel 72 and the front panel 77, the latter, as seen in FIG. 7, includes along its sides the plastic strips 95 to which attach the brackets 96. The brackets 96 in turn hold the wiper blades 97 which may take the form of ordinary windshield wipers of the appropriate length. As seen in FIG. 7, the wiper blades 97 squeeze against the rear panel 72 to form an airtight seal along the vertical edges of the front plate 77 against the rear plate 72. Yet, they allow facile movement of the front plate 77 in either horizontal direction. Along with the plastic strips 81, 85, 87 and 91, the wiper blades 97 provide a complete seal around the edge of the front sheet or panel 77 against the rear sheet 72.

To hold the gloves 66 and 67 also in a air-tight fashion, the front plate 77 has the glove holders 100 firmly attached to it by the screws 101. The glove holder 100 has the first groove 104 in which sits the O-ring 105 which, in FIG. 9, forms part of the glove 67 itself. The tight fit of the O-ring 105 in the groove 104 should provide a completely air-tight seal between the glove 67 and the glove holder 100. However, to provide even greater assurance that such a seal exists and to prevent the glove 67 from dislodging from the holder 100, the holder 100 also includes the second groove 106. The independent O-ring 107 pushes the glove 67 into the second groove 106 and provides greater assurance both against the dislodgement of the glove 67 and for an air-tight seal between it and the holder 100.

Accordingly, what is claimed is:

1. In a clean box having a substantially air-tight enclosure generally defining a volume of space, said enclosure including manipulating means, composed of a web of flexible, substantially air-impermeable material for permitting the handling by a body part in contact with said web of an object within said enclosure, the improvement comprising:

(A) a first substantially rigid surface forming part of said enclosure;

(B) a second substantially rigid surface with a substantially air-tight connection to said manipulating means and lying in close proximity and parallel to and in part in a overlapping relationship with said first rigid surface, said first and second rigid surfaces having respectfully first and second openings therethrough, with said first and second openings being aligned with each other and of different sizes, with said web passing through said openings, and with said first opening being larger than said second opening and with said second opening being substantially a circle and said first opening being substantially an oval, with the smaller dimension of said oval being at least as large as about the diameter of said circle;

(C) moving means, coupled to said first rigid surface of said enclosure and said manipulating means, for permitting the lateral movement of substantially all of said manipulating means and said second rigid surface in a substantially linear direction relative to said first surface; and (D) sealing means, coupled to said moving means and said enclosure, for preventing the passage of a substantial amount of air between the remainder of said enclosure including said first rigid surface and said manipulating means as said manipulating means moves relative to said remainder of said enclosure.

2. The improvement of claim 1 wherein said sealing means prevents the passage of a substantial amount of air between edges of said second rigid surface and said first rigid surface.

3. The improvement of claim 2 wherein said web of said manipulating means includes two portions each in the form of an arm with an attached glove.

4. The improvement of claim 1 wherein said second rigid surface moves horizontally relative to said first surface.

5. The improvement of claim 1 wherein substantially all of said remainder of said enclosure is composed of a substantially rigid material.

6. The improvement of claim 5 wherein said remainder of said enclosure includes a substantially transparent portion above said first and second surfaces, said portion making an angle of at least about 30 degrees but less than about 50 degrees relative to the vertical.

7. The improvement of claim 5 further including an electrical box affixed to a vertical surface of said remainder of said enclosure.

8. The improvement of claim 1 further including pressure means, coupled to said enclosure, for controlling pressure within said enclosure.

9. The improvement of claim 1 wherein said plastic sections are composed of an acetal resin.

10. The improvement of claim 1 wherein said enclosure comprises an experimental box.

11. The improvement of claim 1 wherein said enclosure comprises an incubator.

12. In a clean box having a substantially air-tight enclosure generally defining a volume of space, said enclosure including manipulating means, composed of a web of flexible, substantially air-impermeable material for permitting the handling by a body part in contact with said web of an object within said enclosure, the improvement comprising:

(A) a first substantially rigid surface forming part of said enclosure;

(B) a second substantially rigid surface with a top edge, a bottom edge, and two side edges and a substantially air-tight connection to said manipulating means and lying in close proximity and parallel to and in part in an overlapping relationship with said first rigid surface, said first and second rigid surfaces having respectfully first and second openings therethrough, with said first and second openings being aligned with each other and of different sizes, with said web passing through said openings, and with said second opening being larger than said first opening;

(C) moving means, coupled to said first rigid surface of said enclosure and said manipulating means, for permitting the lateral movement of substantially all of said manipulating means and said second rigid surface relative to said first rigid surface; and (D) sealing means, coupled to said moving means and said enclosure, for preventing the passage of a substantial amount of air between the remainder of said enclosure including said first rigid surface and said manipulating means and between the edges of said second rigid surface and said first rigid surface as said manipulating means moves relative to said remainder of said enclosure, said sealing means including a flexible, polymeric, wiping blade along each of said side edges.

13. The improvement of claim 12 wherein said web of said manipulating means includes two portions each in the form of an arm with an attached glove.

14. The improvement of claim 12 wherein said moving means permits said second rigid surface to move in a substantially linear direction relative to said first rigid surface.

15. The improvement of claim 14 wherein said second rigid surface moves horizontally relative to said first surface.

16. The improvement of claim 15 wherein said second opening is substantially a circle and said first opening is substantially an oval, with the smaller dimension of said oval being at least as large as about the diameter of said circle.

17. The improvement of claim 16 wherein substantially all of said remainder of said enclosure is composed of a substantially rigid material.

18. The improvement of claim 17 wherein said remainder of said enclosure includes a substantially transparent portion above said first and second surfaces, said portion making an angle of at least about 30 degrees but less than about 50 degrees relative to the vertical.

19. The improvement of claim 18 further including an electrical box affixed to a vertical surface of said remainder of said enclosure.

20. The improvement of claim 19 further including pressure means, coupled to said enclosure for controlling pressure within said enclosure.

21. The improvement of claim 12 further including pressure means, coupled to said enclosure, for controlling the pressure within said enclosure.

22. The improvement of claim 21 wherein said enclosure comprises an experimental box.

23. The improvement of claim 21 wherein said enclosure comprises an incubator.

24. The improvement of claim 21 wherein said sealing means further includes an elongated plastic section along said top edge and an elongated plastic section along said bottom edge.

25. The improvement of claim 24 wherein said plastic sections are composed of an acetal resin.

* * * * *